US007586969B2

(12) United States Patent
Egawa et al.

(10) Patent No.: US 7,586,969 B2
(45) Date of Patent: Sep. 8, 2009

(54) METHOD FOR DISCRIMINATING ANOMALY IN GAS COMPOSITION AND DISCHARGE EXCITATION TYPE GAS LASER OSCILLATOR

(75) Inventors: Akira Egawa, Yamanashi (JP); Minoru Ando, Yamanashi (JP); Hajime Ikemoto, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 12/000,267

(22) Filed: Dec. 11, 2007

(65) Prior Publication Data

US 2008/0144681 A1 Jun. 19, 2008

(30) Foreign Application Priority Data

Dec. 14, 2006 (JP) ............................. 2006-337141

(51) Int. Cl.
*H01S 3/03* (2006.01)
(52) U.S. Cl. ............................... 372/61; 372/55; 372/57
(58) Field of Classification Search .................. 372/61, 372/55
See application file for complete search history.

(56) References Cited

FOREIGN PATENT DOCUMENTS

| EP | 0 264 135 A2 | 4/1986 |
|---|---|---|
| EP | 1 667 291 A2 | 6/2006 |
| EP | 1 758 215 A2 | 8/2006 |
| EP | 1758215 A2 * | 2/2007 |
| JP | 55-146993 | 11/1980 |
| JP | 60-170282 | 9/1985 |
| JP | 2-278887 | 11/1990 |
| JP | 5-291650 | 11/1993 |
| JP | 7-221378 | 8/1995 |
| JP | 2000-151002 | 5/2000 |
| JP | 2000-286494 | 10/2000 |
| JP | 2001-44534 | 2/2001 |
| JP | 2001-242077 | 9/2001 |
| JP | 2002-208746 | 7/2002 |

OTHER PUBLICATIONS

European Search Report mailed Mar. 25, 2008 issues in Application No. EP 07 02 3978.5.

* cited by examiner

*Primary Examiner*—Dung T Nguyen
(74) *Attorney, Agent, or Firm*—Drinker Biddle & Reath LLP

(57) ABSTRACT

A discharge excitation type gas laser oscillator has a discharge excitation unit for exciting a laser gas by discharge in a discharge tube to generate induced emission of laser light, a high-frequency power supply unit for supplying power to the discharge tube, and a controller unit for controlling output current of the high-frequency power supply unit. The laser oscillator further has an output detecting section that detects actual current value of the high-frequency power supply unit supplying power to the discharge tube at an arbitrary pressure lower than the high pressure during the steady-state operation, at the start of the laser oscillator, after the laser gas begins discharge excitation at a pressure lower than the high pressure during steady-state operation, an output comparison section that compares the detected actual current value with a normal current value that has been detected when the gas composition of the laser gas is normal at the same pressure as the actual current value is detected; and a power supply control section that discriminates, if the difference between the actual current value and the normal current value is equal to or greater than a preset value, that the gas composition of the laser gas is abnormal, and stops output of the high-frequency power supply unit.

4 Claims, 3 Drawing Sheets

METHOD FOR DISCRIMINATING ANOMALY IN GAS COMPOSITION AND DISCHARGE EXCITATION TYPE GAS LASER OSCILLATOR

CROSS REFERENCE TO RELATED APPLICATIONS

The present application claims the benefit of priority based on Japanese Patent Application No. 2006-337141, filed on Dec. 14, 2006, disclosure of which is incorporated herein in its entirety by reference.

BACKGROUND OF THE INVENTION

1. Field of the Invention

The present invention relates to a method for discriminating an anomaly in gas composition of a laser gas excited by discharge in a discharge tube, and to a discharge excitation type gas laser oscillator using the same.

2. Description of the Related Art

Generally, an example of a conventional high-frequency discharge excitation type gas laser oscillator, in which laser light is generated by discharge excitation of a laser gas in a discharge tube, has been known from the disclosure of Japanese Patent Publication No. H07-221378 A1. A gas laser oscillator as disclosed in Japanese Patent Publication No. H07-221378 A1 has a laser head for generating laser light, a high-frequency power supply unit for supplying electric power to a discharge tube of the laser head, and a controller unit for controlling the high-frequency power supply unit. The gas laser oscillator has the capability of discriminating an anomaly of a discharge load in the laser head. Thus, at the start or during the operation of the high-frequency power supply unit, output data such as current, voltage, and frequency of the high-frequency power supply unit are compared with respective normal values, and based on the result of the comparison, it is discriminated whether or not the discharge in the discharge tube has been started. The discharge load is diagnosed as abnormal, for example, when the discharge has not been started. However, in such a gas laser oscillator, if an anomaly is discriminated during the operation of the high-frequency power supply unit, when there is actually an anomaly in the discharge load, excessive voltage may be applied to the discharge load or the output current may become excessively large, so that the discharge tube or the high-frequency power supply unit may be destroyed. In addition, depending on the conditions for discriminating an anomaly in the discharge load, for example, when the pressure of the laser gas is high, the discharge tube or the high-frequency power supply unit may be destroyed even at the start of the high-frequency power supply unit.

As another example of prior art, Japanese Patent Publication No. S62-60837 B1 discloses a laser apparatus, in which deterioration of laser gas is discriminated by calculating the oscillation efficiency that is calculated based on input current and output current of a laser. In this example of prior art, when the gas pressure is high at the time of discriminating the deterioration of the laser gas, the voltage applied to the discharge load or the output current may become excessively large in the same manner as described above, and may destroy the discharge tube or the high-frequency power supply unit.

As still another example of prior art, a method is disclosed in Japanese Patent Publication H05-291650 A1 (Patent No. 2612659), in which, apart from a laser container for generating laser light, a separate container is provided for detecting gas deterioration so that gas deterioration can be detected by measuring discharge voltage and discharge current therein. In this case, a separate container for detection and a separate electrode need to be provided for detecting gas deterioration. A method is also disclosed in Japanese Patent Publication No. 2000-286494 A1, in which the progressive state of deterioration of a mixed gas in a chamber is discriminated based on a spontaneous emission light detected at the time of discharge. Similarly, Japanese Patent Publication No. H02-278887 A1 discloses a method in which gas deterioration is detected by measuring the intensity of light in a discharge tube by using a photo-sensor and an optical filter for transmitting a light having a peculiar wavelength. Also, Japanese Patent Publication No. 2001-44534 A1 discloses a method and an apparatus for measuring the DC-breakdown voltage of a gas mixture in a laser gas discharge chamber by means of a breakdown voltage detecting unit and adjusting the composition of a discharge gas mixture by using the information on the DC-breakdown voltage. Further, a method is also disclosed in Japanese Patent Publication No. 2001-242077 A1, in which a Fourier Transform Infrared Spectrometer or the like is used to detect and discriminate an infrared absorption spectrum of infrared ray generated in a discharge.

A method is also disclosed in Japanese Patent Publication No. 2002-208746 A1, in which, in order to know the state of a laser gas, a high voltage and temperature are measured, and using a discrimination sequence based on multiple discrimination criteria, the composition of a laser gas in a chamber is maintained while measuring the rate of change of the discharge voltage and the gas temperature before and after gas injection. A system is disclosed in Japanese Patent Publication No. 2000-151002 A1, in which, in order to discriminate the state of gas deterioration, current data is compared with a plurality of master data which has been obtained in a discharge of a gas mixture of an optimum composition, and discrimination is made based on the comparison. In this example of prior art, a large number of data need to be measured and compared, and complicated operational processing and sequences, and a large number of data processings are required.

In the case where detorioration of a laser gas needs to be discriminated under high gas pressure, the voltage applied to the discharge load and the output current tend to become large, and therefore, the discharge tube and the high-frequency power supply unit may be destroyed. There is also another problem that a special measuring unit and apparatus may be required for analyzing the composition of the laser gas.

SUMMARY OF THE INVENTION

In view of above problems, it is an object of the present invention to provide a gas composition anomaly discrimination method and a discharge excitation type gas laser which is capable of discriminating an anomaly of gas composition of a laser gas by using a simple method and preventing damage from being produced in a discharge tube.

In order to attain the above object, in accordance with an aspect of the present invention, there is provided a gas composition anomaly discrimination method for discriminating an anomaly in gas composition of a laser gas excited by discharge in a discharge tube of a laser oscillator, the method comprising the steps of: detecting, at the time of start-up of the laser oscillator after the laser gas begins to be excited by discharge at a pressure lower than the high pressure at the time of steady-state operation, an actual output current value of a high-frequency power supply unit supplying power to the discharge tube, at an arbitrary pressure lower than the high pressure at the time of steady-state operation; comparing the actual output current value with the normal output current value which has been detected when the gas composition of the laser gas is normal at the same pressure as the actual output current values are detected; and discriminating that the gas composition of the laser gas is abnormal if the difference between the actual output current value and the normal output current value is equal to or greater than a preset value.

In accordance with another aspect of the present invention, there is provided a discharge excitation type gas laser oscillator comprising a discharge excitation unit for exciting a laser gas by discharge in a discharge tube to cause induced emission of laser light; a high-frequency power supply unit for supplying electric power to the discharge tube, and a controller unit for controlling the output current of the high-frequency power supply unit, characterized in that the laser oscillator further comprises an output detection section which detects, at the time of start-up of the laser oscillator after the laser gas begins to be excited by discharge at a pressure lower than the high pressure at the time of steady-state operation, an actual output current value of a high-frequency power supply unit supplying power to the discharge tube, at any pressure lower than the high pressure at the time of steady-state operation; an output comparison section which compares the detected actual output current value with the normal output current value which has been detected when the gas composition of the laser gas is normal at the same pressure as the actual output current values are detected; and a power source control section which discriminates, when the difference between the actual output current value and the normal output current value is equal to or greater than a preset value, that the gas composition of the laser gas is abnormal and stops output of the high-frequency power supply unit.

The discharge excitation type gas laser oscillator of the present invention may further comprise a data storage section which stores a data table representing the relationship between the pressure of the laser gas and the output current of the high-frequency power supply unit, wherein the normal output current value can be extracted as master data obtained from the data table.

In the discharge excitation type gas laser oscillator of the present invention, the high-frequency power supply unit may further comprise a DC power supply section for converting an AC power source to a DC power source, and a high-frequency power supply section for converting a DC power source to a high-frequency power source, wherein the output current of the high-frequency power supply unit can be extracted as the output current of said DC power supply section.

In accordance with the invention, since an anomaly of gas composition of a laser gas is discriminated at a pressure of the laser gas lower than the high pressure at the time of steady-state operation, the voltage applied to the discharge load filled with laser gas or the output current can be prevented from becoming excessively large, and damage to the laser oscillator provided with the discharge tube and the high-frequency power supply unit can be thereby avoided. Since an anomaly of gas composition can be discriminated by comparing the actual output current value of the high-frequency power supply unit with the normal output current value, the discrimination of an anomaly of gas composition of the laser gas can be accomplished by simple means.

In accordance with the invention, since an output detecting section detects actual output current value of the high-frequency power supply unit supplying power to the discharge tube, an output comparison section compares the detected actual output current value of the high-frequency power supply unit with a normal output current value, and a power supply control section stops the output current of the high-frequency power supply unit based on control command that gas composition of the laser gas is abnormal, the voltage applied to the discharge load filled with laser gas or the output current can be prevented from becoming excessively large, and damage to the laser oscillator provided with the discharge tube and the high-frequency power supply unit can be thereby avoided. The discrimination of an anomaly of gas composition of the laser gas can be accomplished by simple means.

In addition, comparison of the actual output current value of the high-frequency power supply unit with the normal output current value obtained from the master table can be performed at any number of different gas pressures while the gas pressure of the laser gas is being raised. Therefore, anomaly diagnosis of the gas composition can be carried out more accurately.

Also, since the output current from the high-frequency power supply unit is the output current from the DC power supply section, an anomaly of gas composition can be diagnosed at low output current before the DC power source is converted to the high-frequency power source.

BRIEF DESCRIPTION OF THE DRAWINGS

The above and other objects, features and advantages of the present invention will become more apparent from the following description of a preferred embodiment with reference to appended drawings, in which.

DETAILED DESCRIPTION

Figure 1:
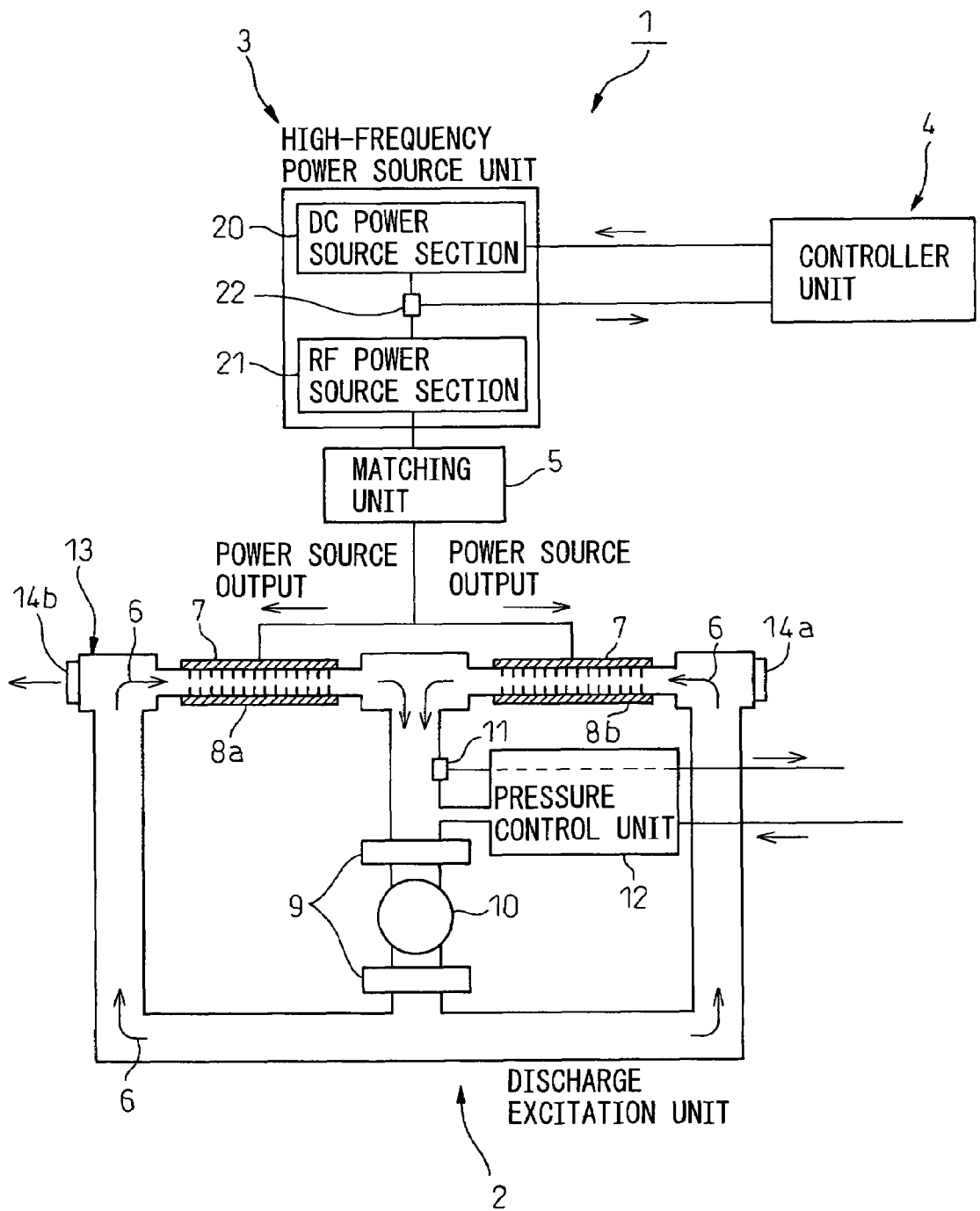
FIG. 1 is a view showing the construction of a discharge excitation type gas laser oscillator according to an embodiment of the present invention.

The present invention will be described in detail below with reference to drawings showing specific examples of a preferred embodiment. FIG. 1 is a view showing a discharge excitation type gas laser oscillator according to an embodiment of the present invention. As shown in FIG. 1, a discharge excitation type gas laser oscillator according to this embodiment is an oscillator which uses a high-frequency AC power supply unit 3 to excite a laser gas 6 to produce electric discharge, and has a discharge excitation unit 2 for exciting discharge of laser gas 6 filled in a discharge tube 7 to cause induced emission of laser light, high-frequency power supply unit 3 for supplying power to discharge tube 7, a controller unit 4 for controlling the power of high-frequency power supply unit 3 and the gas pressure of laser gas 6, and a matching unit 5 as impedance matching means for matching the output impedance on the side of high-frequency power supply unit 3 to the input impedance on the side of the discharge tube.

Discharge excitation unit 2 has a heat exchanger 9 for cooling laser gas 6 heated to high temperature by the discharge in discharge tube 7 and the compression heat of a turbo blower 10, turbo blower 10 as a blower for circulating laser gas 6 at high speed, a pressure sensor 11 for detecting the gas pressure of laser gas 6, a pressure control unit 12 for adjusting the pressure of laser gas 6, and an optical resonator 13 for generating laser light from the laser gas excited by discharge. Discharge tube 7 has a pair of discharge electrodes 8a, 8b arranged on outer sides so as to sandwich discharge tube 7, and is disposed in optical resonator 13. Preferably, discharge electrodes 8a and 8b are of same size and are suitably coated. A high-frequency power supply section 21 is connected to discharge electrodes 8a and 8b, and is adapted to supply a high-frequency current to discharge tube 7 in accordance with the electric current command from a power supply control circuit 24.

The gas pressure of laser gas 6 is adjusted by pressure control unit 12 which is controlled by the pressure control signal outputted from controller unit 4 when the detection signal detected by pressure sensor 11 is read-in by controller unit 4. Thus, at the time of start-up of the laser oscillator, the pressure of laser gas 6 is gradually raised from low pressure to high pressure while excited in discharge, until a constant pressure is achieved in a steady-state operation. At the time of start-up of laser oscillator 1, the gas pressure of laser gas 6 is low, so that a low voltage and a low current are applied to discharge tube 7 and it is possible to start laser oscillator 1 smoothly.

Optical resonator 13 is composed of a rear mirror (total reflection mirror) 14a provided at one end and having no partial transmission and an output mirror (partial reflection mirror) 14b provided at the other end. Rear mirror 14a is a mirror made of germanium having reflectance of 99.5%, and output mirror 14b is a mirror made of zinc selenide having reflectance of 65%, and two mirrors 14a, 14b together form a stable type resonator. When a high-frequency power is supplied to discharge tube 7, the laser gas is excited in discharge to generate laser light in optical resonator 13. The laser light is repeatedly reflected between output mirror 14b and rear mirror 14a, and is amplified by induced emission, and a portion of the emitted light is extracted from output mirror 14b to the outside as laser light with a wavelength of 10.6 μm.

Discharge excitation unit 2 further has an unshown shutter. The shutter comprises a copper plate having gold plating on the surface, and is opened or closed in accordance with the command from control unit 4. When the shutter is closed, it reflects the laser light outputted from output mirror 14b. The reflected laser light is absorbed by a beam absorber. When the shutter is open, the laser light is outputted to the outside of laser oscillator 1.

High-frequency power supply unit 3 has a DC power supply section 20 for rectifying a commercial three phase AC power source and converting it to a variable DC power source, high-frequency power supply section 21 for converting the DC power source to a high-frequency power source, and a current detecting section (output detecting section) 22 which is positioned between DC power supply section 20 and high-frequency power supply section 21 and detects current outputted from DC power supply section 20. Power from high-frequency power supply section 21 is supplied via matching unit 5 to discharge tube 7.

Controller unit 4 has a CPU (central processing unit) and various memories connected via buses to CPU, and power supply control circuit (power source control section) 24, a pressure control circuit 25, a shutter control circuit 26 and the like, are composed of them. Various memories include ROMs, RAMS, non-volatile memories and the like. Power supply control circuit 24 is a controller that outputs commands, converts AC to DC by means of switching operation in DC power supply section 20, converts the obtained DC to high-frequency AC at an arbitrary frequency (for example, 2 MHz), and supplies the high-frequency current to discharge tube 7.

Current detecting section 22 monitors output current from DC power supply section 20. By providing current detecting section 22 between DC power supply section 20 and high-frequency power supply section 21, the operating frequency and the operating voltage of the output current becomes low, and the power source circuit including current detecting section 22 can be easily composed. It is to be understood that the present invention is not limited to the construction in which current detecting section 22 is provided between DC power supply section 20 and high-frequency power supply section 21, and that it can be provided after high-frequency power supply section 21.

Pressure control circuit 25 is a controller that outputs a pressure command based on the gas pressure obtained as the feed-back from pressure sensor 11, controls a pressure control unit (pressure control section) 12 based on the pressure command, and raises the gas pressure at the start of gas laser oscillator 1 from a low pressure to a high pressure under an arbitrary condition. Shutter control circuit 26 outputs a shutter open/close signal for opening/closing the unshown shutter in specified timing.

Matching unit 5 includes a matching circuit for impedance matching between high-frequency power supply section 21 and discharge tube 7. Power can be thereby efficiently supplied from high-frequency power supply section 21 to discharge tube 7.

Figure 3:
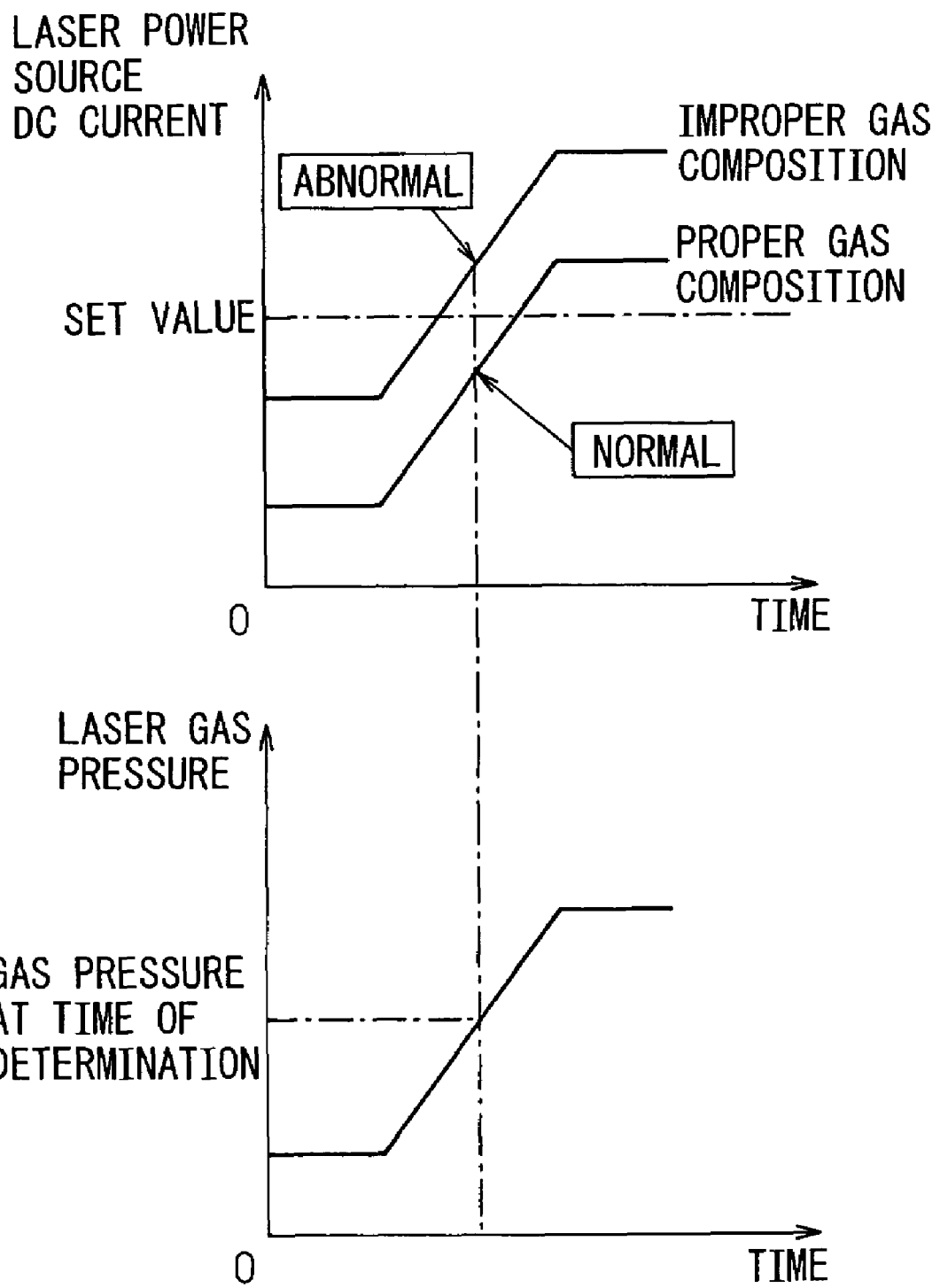
FIG. 3 is a view showing the relationship of gas pressure of the laser gas and the output current with respect to time.

Next, the components of laser oscillator 1 related to the present invention will be described in further detail. Laser oscillator 1 according to the present embodiment is constructed such that an anomaly in the gas composition of laser gas 6 can be discriminated at a low pressure of laser gas 6 at a stage before steady-state operation. The discrimination of an anomaly in the gas composition is carried out based on the current value detected from DC power supply section 20. The reason for this is that, when there is an anomaly in the laser gas, the impedance matching varies significantly and the output current of DC power supply section 20 of the high-frequency power source and the voltage applied to the discharge load may become abnormally large and may lead to damage in the high-frequency power supply unit or the discharge tube. Therefore, if the detected current value is larger than the normal value, the gas composition is discriminated to be abnormal. Further, based on the premise that there is a direct proportional relationship between the current (supplied power) and the gas pressure, as shown in FIG. 3, it is possible, by detecting the current value at low gas pressure, even if there is an anomaly in the gas composition, to discriminate an anomaly of the gas composition without causing damage to the discharge tube.

Current detecting section 22 for detecting current as the output of DC power supply section 20 is constructed such that, at the start of laser oscillator 1, after laser gas 6 begins discharge excitation at a pressure lower than the high pressure during steady-state operation, it detects current value at an arbitrary pressure lower than the high pressure during steady-state operation. Since the current value is detected at a low gas pressure, applied current that exceeds the permissible upper bound value can be avoided, and damage to discharge tube 7 due to an anomaly in the gas composition can be prevented. Thus, an anomaly of the gas composition can be discriminated in non-destructive manner.

Figure 2:
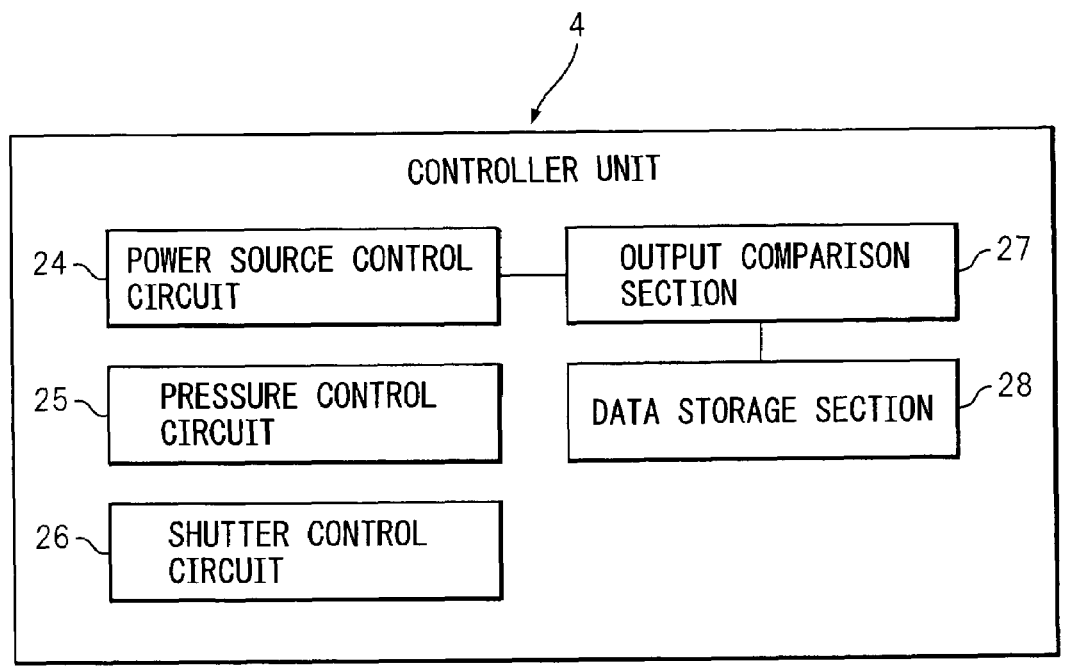
FIG. 2 is a view showing the construction of a controller unit of the discharge excitation type gas laser oscillator shown in FIG. 1.

The current detected by current detecting section 22 is compared in a output comparison section 27 of controller unit 4 shown in FIG. 2 with the normal current value (output value) of DC power supply section 20 that would have been detected at the same gas pressure when the gas composition of laser gas 6 is normal. The current value for the normal gas composition of laser gas 6 can be obtained as data corresponding to the arbitrary gas pressure from a data storage section 28 which stores the data table representing the relationship between the pressure of the laser gas and the current. Thus, at the start of laser oscillator 1, an anomaly of the gas composition can be discriminated at a plurality of arbitrary low pressures, and the reliability of the discrimination method can be thereby improved.

When the difference between the detected actual current value and the normal current value is equal to or greater than the set value that has been preset at the arbitrary gas pressure at the time of current detection, the gas composition of laser gas 6 is discriminated to be abnormal, and a control command as a result of the discrimination is outputted from output comparison section 27 to power supply control circuit 24 so as to stop the output from high-frequency power supply unit 3. When the difference is not greater than the set value, the gas composition is discriminated to be normal. Thus, even if there is an anomaly in the gas composition of the laser gas, the voltage applied to the discharge load filled with laser gas 6 or the output current can be prevented from becoming excessively large, and damage to the discharge tube can be avoided.

As has been described above, in accordance with this embodiment, an anomaly in the gas composition can be discriminated at a gas pressure lower than the gas pressure during steady-state operation, so that damage to the discharge tube due to the current applied to the discharge load exceeding the normal value in case of anomaly in the gas composition can be prevented. Thus, a simple method can be used to discriminate an anomaly in the gas composition of the laser gas safely.

The present invention is not limited to the above-described embodiment, but can be implemented in various modifications. Although, in the above-described embodiment, discrimination of an anomaly in the gas composition can be performed plural times by referencing data corresponding to plural arbitrary gas pressures from the data table stored in data storage section 28 for comparison with the detected actual current values, it is possible to discriminate an anomaly in the gas composition even if there is only one reference data available corresponding to an arbitrary gas pressure.

The invention claimed is:

1. Method for discriminating an anomaly in gas composition of a laser gas excited by discharge in a discharge tube of a laser oscillator, said method comprising:

detecting an actual output current value of a high-frequency power supply unit supplying power to said discharge tube at an arbitrary pressure lower than high pressure during steady-state operation, at a start of said laser oscillator, after said laser gas begins discharge excitation at a pressure lower than said high pressure during said steady-state operation;

comparing said detected actual output current value with a normal output current value that has been detected when said gas composition of said laser gas is normal at the same pressure as said actual output current value is detected; and discriminating, if a difference between said actual output current value and said normal output current value is equal to or greater than a preset value, that said gas composition of said laser gas is abnormal.

2. A discharge excitation type gas laser oscillator comprising a discharge excitation unit for exciting a laser gas by discharge in a discharge tube to generate induced emission of laser light; a high-frequency power supply unit for supplying power to said discharge tube; and a controller unit for controlling output of said high-frequency power supply unit; further comprising:

an output detecting section that detects actual output current value of said high-frequency power supply unit supplying power to said discharge tube at an arbitrary pressure lower than high pressure during steady-state operation, at a start of said laser oscillator, after said laser gas begins discharge excitation at a pressure lower than said high pressure during said steady-state operation;

an output comparison section that compares said detected actual output current value with a normal output current value that has been detected when a gas composition of said laser gas is normal at the same pressure as said actual output current value is detected; and a power supply control section that discriminates, if a difference between said actual output current value and said normal output current value is equal to or greater than a preset value, that said gas composition of said laser gas is abnormal, and stops said output current of said high-frequency power supply unit.

3. A discharge excitation type gas laser oscillator as claimed in claim 2, further comprising:

a data storage section that stores a data table representing a relationship between a pressure of said laser gas and said output current of said high-frequency power supply unit;

wherein said normal output current value is a master data obtained from said data table.

4. A discharge excitation type gas laser oscillator as claimed in claim 2, wherein said high-frequency power supply unit comprises a DC power supply section for converting an AC power source to said DC power source, and a high-frequency power source section for converting said DC power source to a high-frequency power source, and wherein said output current from said high-frequency power supply unit is output current from said DC power supply section.

* * * * *